United States Patent
Hashimoto et al.

(10) Patent No.: US 11,459,733 B2
(45) Date of Patent: Oct. 4, 2022

(54) CONTROL SYSTEM FOR WORK VEHICLE, METHOD, AND WORK VEHICLE

(71) Applicant: KOMATSU LTD., Tokyo (JP)

(72) Inventors: Kazuhiro Hashimoto, Tokyo (JP); Kenjiro Shimada, Tokyo (JP); Toshihiro Kawano, Tokyo (JP); Yosuke Yamaguchi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 251 days.

(21) Appl. No.: 16/613,302

(22) PCT Filed: Aug. 29, 2017

(86) PCT No.: PCT/JP2017/030934
§ 371 (c)(1),
(2) Date: Nov. 13, 2019

(87) PCT Pub. No.: WO2019/043788
PCT Pub. Date: Mar. 7, 2019

(65) Prior Publication Data
US 2021/0079629 A1 Mar. 18, 2021

(51) Int. Cl.
*E02F 9/26* (2006.01)
*G05D 1/00* (2006.01)
(Continued)

(52) U.S. Cl.
CPC ............ *E02F 9/262* (2013.01); *E02F 9/2004* (2013.01); *E02F 9/265* (2013.01); *G05D 1/0094* (2013.01);
(Continued)

(58) Field of Classification Search
CPC .................................................. E02F 9/2004
See application file for complete search history.

(56) References Cited

U.S. PATENT DOCUMENTS

| 4,630,685 A | 12/1986 | Huck, Jr. et al. |
| 5,404,661 A * | 4/1995 | Sahm .................... E02F 3/435 |
| | | 701/50 |

(Continued)

FOREIGN PATENT DOCUMENTS

| CN | 107002383 A | 8/2017 |
| JP | 10-88612 A | 4/1998 |

(Continued)

OTHER PUBLICATIONS

The International Search Report for the corresponding international application No. PCT/JP2017/030934, dated Oct. 10, 2017.

(Continued)

*Primary Examiner* — Russell Frejd
*Assistant Examiner* — Sara J Lewandroski
(74) *Attorney, Agent, or Firm* — Global IP Counselors, LLP

(57) ABSTRACT

A control system for a work includes an operating device and a controller. The operating device outputs an operation signal indicative of an operation by an operator. The controller is in communication with the operating device. The controller determines a target profile of a terrain to be worked on. The controller generates a command signal to operate the work implement according to the target profile. The controller receives the operation signal from the operating device. The controller determines an operation of the work implement based on the operation signal. The controller corrects the target profile according to the operation by the operator when the operation of the work implement by the operator is performed.

11 Claims, 16 Drawing Sheets

(51) Int. Cl.
*E02F 9/20* (2006.01)
*E02F 3/84* (2006.01)
(52) U.S. Cl.
CPC ...... *E02F 3/844* (2013.01); *G05D 2201/0202* (2013.01)

(56) References Cited

U.S. PATENT DOCUMENTS

| | | | | |
|---|---|---|---|---|
| 5,631,658 | A * | 5/1997 | Gudat | G05D 1/0278 701/1 |
| 5,854,988 | A * | 12/1998 | Davidson | E02F 9/26 701/50 |
| 5,951,613 | A | 9/1999 | Sahm et al. | |
| 6,181,999 | B1 * | 1/2001 | Yamamoto | E02F 3/844 701/50 |
| 9,297,147 | B1 * | 3/2016 | Wei | E02F 9/2045 |
| 9,328,479 | B1 * | 5/2016 | Rausch | E02F 9/265 |
| 9,481,977 | B1 * | 11/2016 | Clar | G05D 1/0088 |
| 10,066,367 | B1 * | 9/2018 | Wang | E02F 9/265 |
| 11,142,883 | B2 * | 10/2021 | Izumikawa | E02F 3/425 |
| 2005/0027420 | A1 * | 2/2005 | Fujishima | E02F 9/2045 701/50 |
| 2005/0046599 | A1 * | 3/2005 | Sahm | E02F 9/26 340/995.1 |
| 2006/0070746 | A1 * | 4/2006 | Lumpkins | E02F 3/844 172/2 |
| 2008/0073089 | A1 | 3/2008 | Green | |
| 2010/0250023 | A1 * | 9/2010 | Gudat | E02F 9/265 701/2 |
| 2011/0148856 | A1 * | 6/2011 | Sprock | E02F 9/261 345/419 |
| 2012/0016557 | A1 * | 1/2012 | Verboomen | E02F 3/907 701/50 |
| 2012/0136508 | A1 * | 5/2012 | Taylor | E02F 9/2045 701/25 |
| 2012/0293316 | A1 * | 11/2012 | Johnson | E02F 9/2087 340/438 |
| 2013/0081831 | A1 | 4/2013 | Hayashi | |
| 2013/0158819 | A1 * | 6/2013 | Callaway | E02F 3/845 701/50 |
| 2014/0100712 | A1 * | 4/2014 | Nomura | E02F 9/264 701/1 |
| 2014/0174770 | A1 * | 6/2014 | Wei | E02F 3/841 701/27 |
| 2014/0180444 | A1 * | 6/2014 | Edara | G05D 1/00 700/56 |
| 2014/0180547 | A1 * | 6/2014 | Edara | G05D 1/0278 701/50 |
| 2014/0257646 | A1 | 9/2014 | Ishibashi et al. | |
| 2014/0277957 | A1 * | 9/2014 | Clar | E02F 5/32 701/50 |
| 2015/0019086 | A1 | 1/2015 | Hayashi et al. | |
| 2016/0040397 | A1 * | 2/2016 | Kontz | G05B 13/04 701/400 |
| 2016/0076223 | A1 * | 3/2016 | Wei | E02F 3/435 701/50 |
| 2016/0122969 | A1 * | 5/2016 | Noborio | E02F 9/262 701/50 |
| 2017/0284070 | A1 * | 10/2017 | Matsuyama | E02F 9/2292 |
| 2017/0292247 | A1 * | 10/2017 | Yokoo | E02F 9/2004 |
| 2018/0002891 | A1 * | 1/2018 | Sharpe | E02F 3/6454 |
| 2018/0202129 | A1 | 7/2018 | Fujii et al. | |
| 2019/0055715 | A1 * | 2/2019 | Wei | E02F 9/205 |

FOREIGN PATENT DOCUMENTS

| | | | |
|---|---|---|---|
| JP | 10-141955 | A | 5/1998 |
| JP | 5247939 | B1 | 7/2013 |
| JP | 2014-84683 | A | 5/2014 |
| JP | 2014-173321 | A | 9/2014 |
| WO | WO-2016129708 | A1 * | 8/2016 ............... E02F 3/32 |

OTHER PUBLICATIONS

The Office Action for the corresponding Chinese application No. 201780090886.5, dated Mar. 22, 2021.

Examination report No. 1 for the corresponding Australian application No. 2017429426, dated Sep. 10, 2020.

* cited by examiner

CONTROL SYSTEM FOR WORK VEHICLE, METHOD, AND WORK VEHICLE

CROSS-REFERENCE TO RELATED APPLICATIONS

This application is a U.S. National stage application of International Application No. PCT/JP2017/030934, filed on Aug. 29, 2017.

BACKGROUND

Field of the Invention

The present invention relates to a control system for a work vehicle, method, and a work vehicle.

Background Information

In a work vehicle provided with a work implement, a technique is known in which a controller automatically controls the position of the work implement during work. For example, in Japanese Patent No. 5247939, the load added to work implement is detected, and automatic excavation is possible by automatically controlling the position of the work implement according to the load.

SUMMARY

During automatic excavation, as described above, even if the operator changes the position of the work implement by manually operating the lever for the work implement, the work implement will be automatically returned to the original position. Therefore, in order to change the position of the work implement, the operator needs to perform an operation to cancel the automatic excavation.

An object of the present invention is to provide a control system for a work vehicle, a method, and a work vehicle in which a position of a work implement is easily changeable by an operator in automatic control of the work implement.

A control system for a work vehicle according to a first aspect includes an operating device and a controller. The operating device outputs an operation signal indicative of an operation by an operator. The controller communicates with the operating device. The controller is programmed to do the following. The controller determines a target profile for work. The controller generates a command signal to move the work implement according to the target profile. The controller receives the operation signal from the operating device. The controller determines an operation of the work implement by the operator based on the operation signal. The controller corrects the target profile according to the operation by the operator when the operation of the work implement by the operator is performed.

A method according to a second aspect is a method executed by a controller to control a work vehicle including a work implement, including the following processing. A first process is to determine a target profile for work. A second process is to generate a command signal to move the work implement in accordance with the target profile. A third process is to receive an operation signal indicative of an operation by an operator. A fourth process is to determine the operation of the work implement by the operator based on the operation signal. A fifth process is to correct the target profile in accordance with the operation by the operator when the operation of the work implement by the operator is performed.

A work vehicle according to a third aspect includes a work implement, an operating device, and a controller. The operating device outputs an operation signal indicative of an operation by an operator. The controller controls the work implement. The controller is programmed to do the following. The controller determines a target profile for work. The controller generates a command signal to move the work implement according to the target profile. The controller receives the operation signal from the operating device. The controller determines the operation of the work implement by the operator based on the operation signal. The controller corrects the target profile according to the operation by the operator when the operation of the work implement by the operator is performed.

Advantageous Effects of Invention

In the present invention, when the operation of the work implement by the operator is performed during the automatic control of the work implement, the target profile is modified according to the operation by the operator. Therefore, the position of the work implement can be easily changed according to the operator's intention without performing a complicated operation to release the automatic control.

DETAILED DESCRIPTION OF EMBODIMENT(S)

Figure 1:
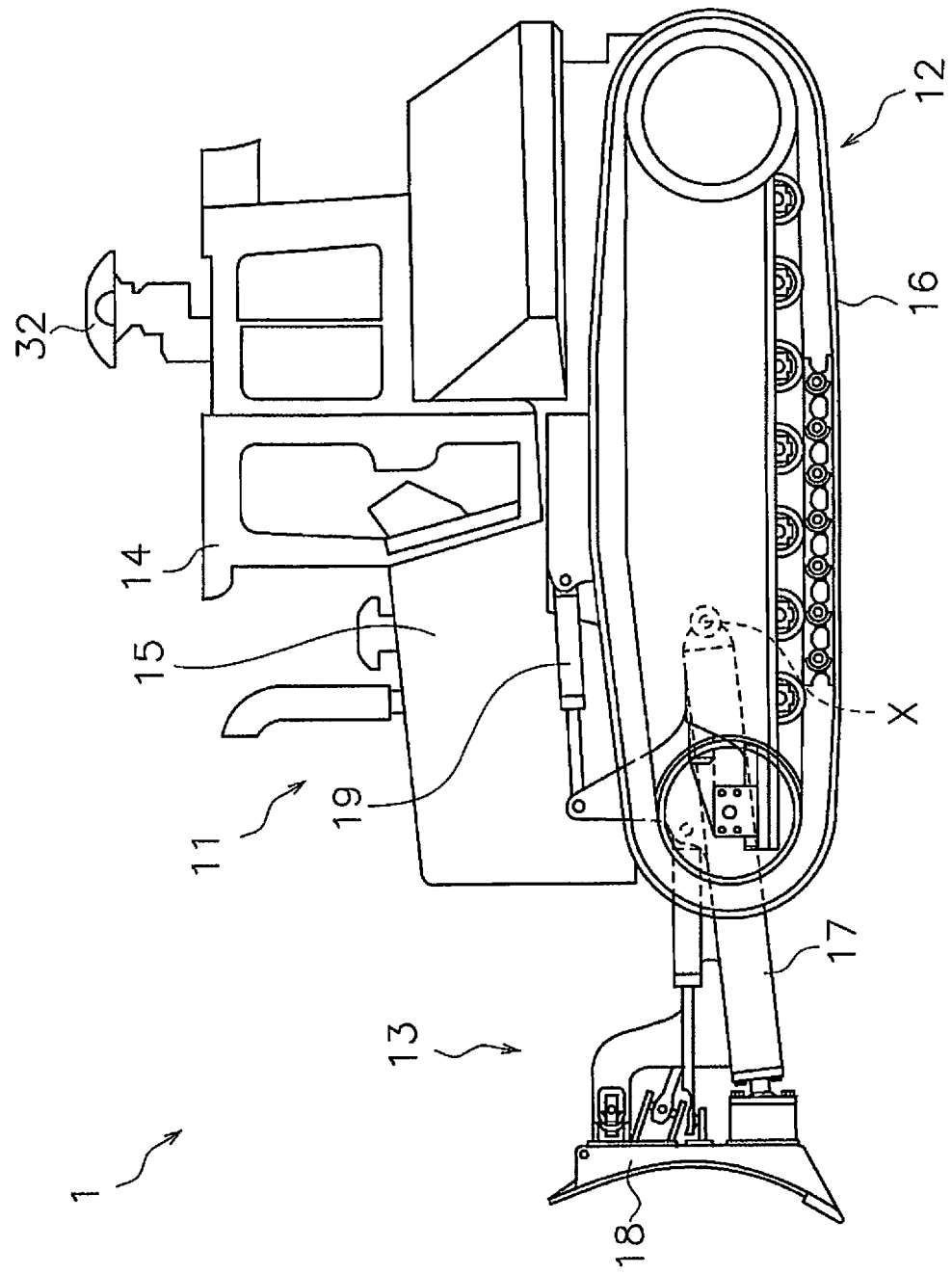
FIG. 1 is a side view showing a work vehicle according to an embodiment.

Hereinafter, a work vehicle according to an embodiment will be described with reference to the drawings. FIG. 1 is a side view showing a work vehicle 1 according to the embodiment. The work vehicle 1 according to the present embodiment is a bulldozer. The work vehicle 1 includes a vehicle body 11, a traveling device 12, and a work implement 13.

The vehicle body 11 includes a cab 14 and an engine compartment 15. A driver's seat (not illustrated) is disposed in the cab 14. The engine compartment 15 is disposed in front of the cab 14. The traveling device 12 is attached to the lower part of the vehicle body 11. The traveling device 12 includes a pair of right and left crawler belts 16. In FIG. 1, only the left crawler belt 16 is illustrated. As the crawler belts 16 rotate, the work vehicle 1 travels. The traveling of the work vehicle 1 may be any of autonomous traveling, semi-autonomous traveling, and traveling by the operation of the operator.

The work implement 13 is attached to the vehicle body 11. The work implement 13 includes a lift frame 17, a blade 18 and a lift cylinder 19.

The lift frame 17 is mounted on the vehicle body 11 so as to be movable up and down about an axis X extending in the vehicle width direction. The lift frame 17 supports the blade 18. The blade 18 is disposed in front of the vehicle body 11. The blade 18 moves up and down as the lift frame 17 moves up and down.

The lift cylinder 19 is connected to the vehicle body 11 and the lift frame 17. The lift frame 17 rotates up and down about the axis X by the expansion and contraction of the lift cylinder 19.

Figure 2:
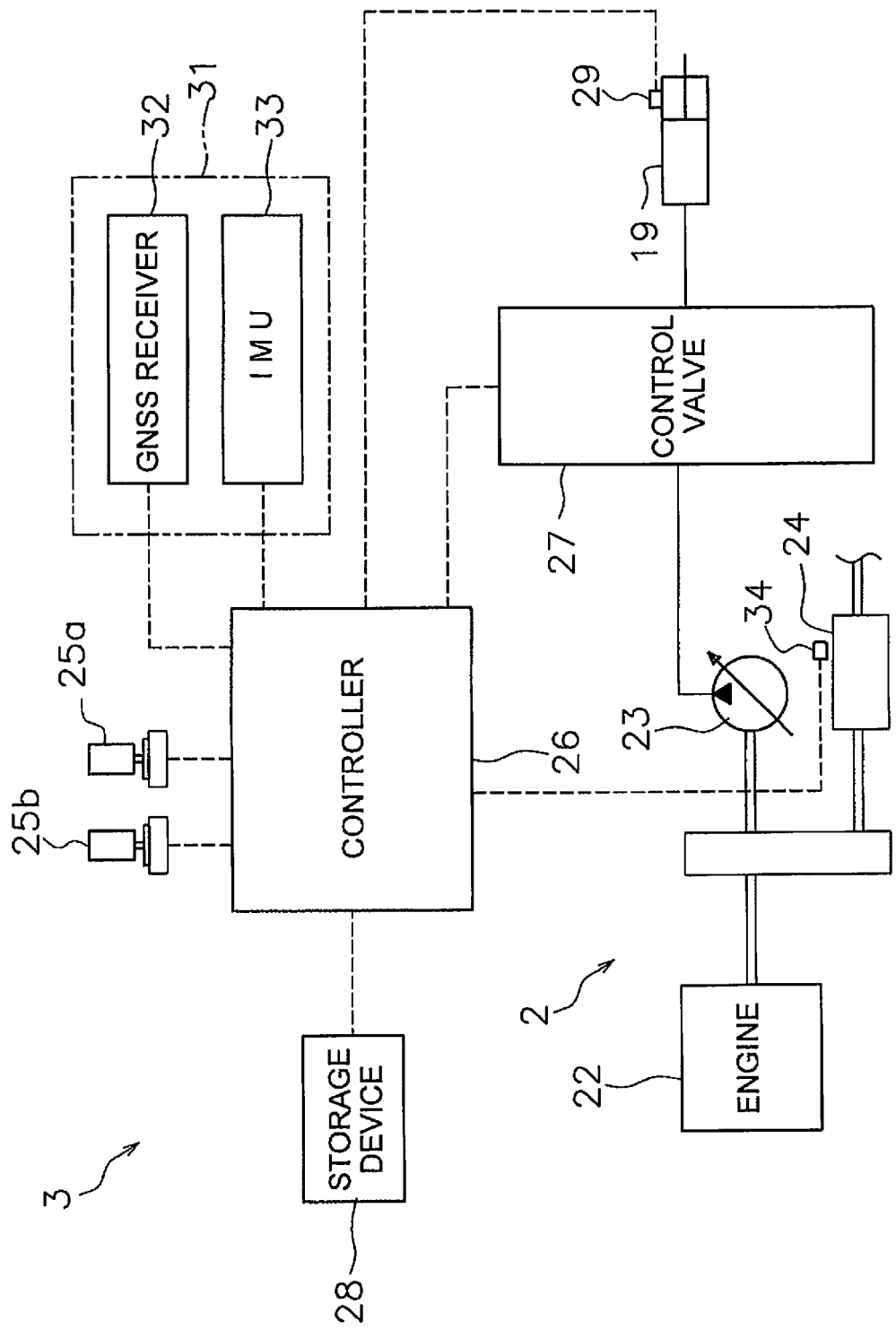
FIG. 2 is a block diagram showing a configuration of a drive system and a control system for the work vehicle.

FIG. 2 is a block diagram showing the configuration of the drive system 2 of the work vehicle 1 and the control system 3. As illustrated in FIG. 2, the drive system 2 includes an engine 22, a hydraulic pump 23, and a power transmission 24.

The hydraulic pump 23 is driven by the engine 22 and discharges hydraulic fluid. The hydraulic fluid discharged from the hydraulic pump 23 is supplied to the lift cylinder 19. Although one hydraulic pump 23 is illustrated in FIG. 2, a plurality of hydraulic pumps may be provided.

The power transmission 24 transmits the driving force of the engine 22 to the traveling device 12. The power transmission 24 may be, for example, HST (Hydro Static Transmission). Alternatively, the power transmission 24 may be, for example, a torque converter or a transmission including a plurality of speed gears.

The control system 3 includes a first operating device 25a, a second operating device 25b, a controller 26, a storage device 28, and a control valve 27. The first operating device 25a and the second operating device 25b are disposed in the cab 14. The first operating device 25a is a device for operating the traveling device 12. The first operating device 25a receives an operation by an operator for driving the traveling device 12, and outputs an operation signal according to the operation. The second operating device 25b is a device for operating the work implement 13. The second operating device 25b receives an operation by the operator for driving the work implement 13, and outputs an operation signal according to the operation. The first operating device 25a and the second operating device 25b include, for example, an operating lever, a pedal, a switch, and the like.

The first operating device 25a is operable to a forward position, a reverse position, and a neutral position. An operation signal indicative of the position of the first operating device 25a is output to the controller 26. The controller 26 controls the traveling device 12 or the power transmission 24 so that the work vehicle 1 moves forward when the operation position of the first operating device 25a is the forward position. When the operation position of the first operating device 25a is the reverse position, the controller 26 controls the traveling device 12 or the power transmission 24 so that the work vehicle 1 moves backward.

The second operating device 25b is operable to a raising position, a lowering position, and a neutral position. An operation signal indicative of the position of the second operating device 25b is output to the controller 26. The controller 26 controls the lift cylinder 19 so that the blade 18 rises when the operation position of the second operating device 25b is the raising position. When the operation position of the second operating device 25b is the lowering position, the controller 26 controls the lift cylinder 19 so that the blade 18 is lowered.

The controller 26 is programmed to control the work vehicle 1 based on the acquired data. The controller 26 includes, for example, a processor such as a CPU. The controller 26 acquires operation signals from the operating devices 25a and 25b. The controller 26 controls the control valve 27 based on the operation signal. The controller 26 is not limited to one unit, but may be divided into a plurality of controllers.

The control valve 27 is a proportional control valve, and is controlled by a command signal from the controller 26. The control valve 27 is disposed between a hydraulic actuator such as the lift cylinder 19 and the hydraulic pump 23. The control valve 27 controls the flow rate of hydraulic fluid supplied from the hydraulic pump 23 to the lift cylinder 19. The controller 26 generates a command signal to the control valve 27 so that the blade 18 operates in response to the operation of the second operating device 25b. Thus, the lift cylinder 19 is controlled in accordance with the amount of operation of the second operating device 25b. The control valve 27 may be a pressure proportional control valve. Alternatively, the control valve 27 may be an electromagnetic proportional control valve.

Figure 3:
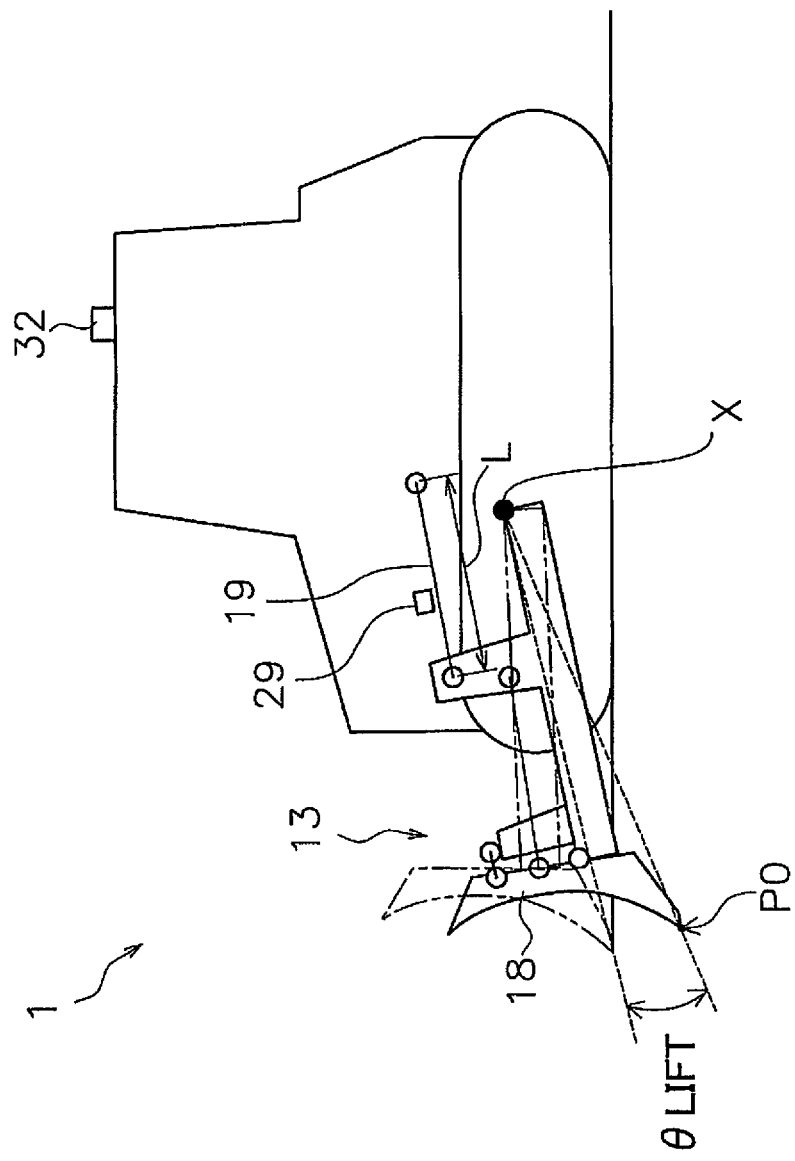
FIG. 3 is a schematic view showing a configuration of the work vehicle.

The control system 3 includes a work implement sensor 29. The work implement sensor 29 detects the position of the work implement, and outputs a work implement position signal indicative of the position of the work implement. In detail, the work implement sensor 29 detects the stroke length of the lift cylinder 19 (hereinafter referred to as "lift cylinder length L"). FIG. 3 is a schematic view showing the configuration of the work vehicle 1.

In FIG. 3, the reference position of the work implement 13 is indicated by a two-dot chain line. The reference position of the work implement 13 is the position of the blade 18 with the tip of the blade 18 in contact with the ground on the horizontal ground. The lift angle θ lift is an angle from the reference position of the work implement 13.

As illustrated in FIG. 2, the control system 3 includes a position sensor 31. The position sensor 31 measures the position of the work vehicle 1. The position sensor 31 includes a Global Navigation Satellite System (GNSS) receiver 32 and an IMU 33. The GNSS receiver 32 is, for example, a receiver for GPS (Global Positioning System). The antenna of the GNSS receiver 32 is arranged on the cab 14. The GNSS receiver 32 receives a positioning signal from a satellite, calculates the position of the antenna based on the positioning signal, and generates vehicle body position data. The controller 26 acquires the vehicle body position data from the GNSS receiver 32. The controller 26 obtains the traveling direction of the work vehicle 1 and the vehicle speed from the vehicle body position data.

The IMU 33 is an inertial measurement unit. The IMU 33 acquires vehicle body inclination angle data. The vehicle body inclination angle data includes an angle (pitch angle)

to the horizontal in the longitudinal direction of the vehicle and an angle (roll angle) to the horizontal in the lateral direction of the vehicle. The controller 26 acquires the vehicle body inclination angle data from the IMU 33.

The controller 26 calculates the blade tip position P0 from the lift cylinder length L, the vehicle body position data, and the vehicle body inclination angle data. As illustrated in FIG. 3, the controller 26 calculates global coordinates of the GNSS receiver 32 based on the vehicle body position data. The controller 26 calculates the lift angle θ lift based on the lift cylinder length L. The controller 26 calculates local coordinates of the blade tip position P0 with respect to the GNSS receiver 32 based on the lift angle θ lift and the vehicle body dimension data. The vehicle body dimension data is stored in the storage device 28 and indicates the position of the work implement 13 with respect to the GNSS receiver 32. The controller 26 calculates global coordinates of the blade tip position P0 based on the global coordinates of the GNSS receiver 32, the local coordinates of the blade tip position P0, and the vehicle body inclination angle data. The controller 26 acquires the global coordinates of the blade tip position P0 as the blade tip position data.

The control system 3 includes an output sensor 34 that measures the output of the power transmission 24. When the power transmission 24 is an HST including a hydraulic motor, the output sensor 34 may be a pressure sensor that detects the driving hydraulic pressure of the hydraulic motor. The output sensor 34 may be a rotation sensor that detects the output rotation speed of the hydraulic motor. If the power transmission 24 includes a torque converter, the output sensor 34 may be a rotation sensor that detects the output rotational speed of the torque converter. A detection signal indicative of the detection value of the output sensor 34 is output to the controller 26.

The storage device 28 includes, for example, a memory and an auxiliary storage device. The storage device 28 may be a semiconductor memory or a hard disk. The storage device 28 is an example of a non-transitory computer readable recording medium. The storage device 28 stores computer instructions that can be executed by the processor and control the work vehicle 1.

The storage device 28 stores design topography data and work site topography data. The design topography data indicates a final design topography. The final design topography is the final target shape of the work site surface. The design topography data is, for example, a construction drawing in a three-dimensional data format. The work site topography data indicates a wide area topography of the work site. The work site topography data is, for example, a current topographical survey map in a three-dimensional data format. The work site topography data can be obtained, for example, by aerial laser survey.

The controller 26 acquires actual topography data. The actual topography data indicates the actual topography of the work site. The actual topography of the work site is the topography of the area along the traveling direction of work vehicle 1. The actual topography data is obtained by calculation in the controller 26 from the work site topography data and the position and the traveling direction of the work vehicle 1 obtained from the position sensor 31 described above.

The controller 26 automatically controls the work implement 13 based on the actual topography data, the design topography data, and the blade tip position data. The automatic control of the work implement 13 may be semi-automatic control performed together with the manual operation by the operator. Alternatively, the automatic control of the work implement 13 may be a fully automatic control performed without manual operation by the operator.

Figure 4:
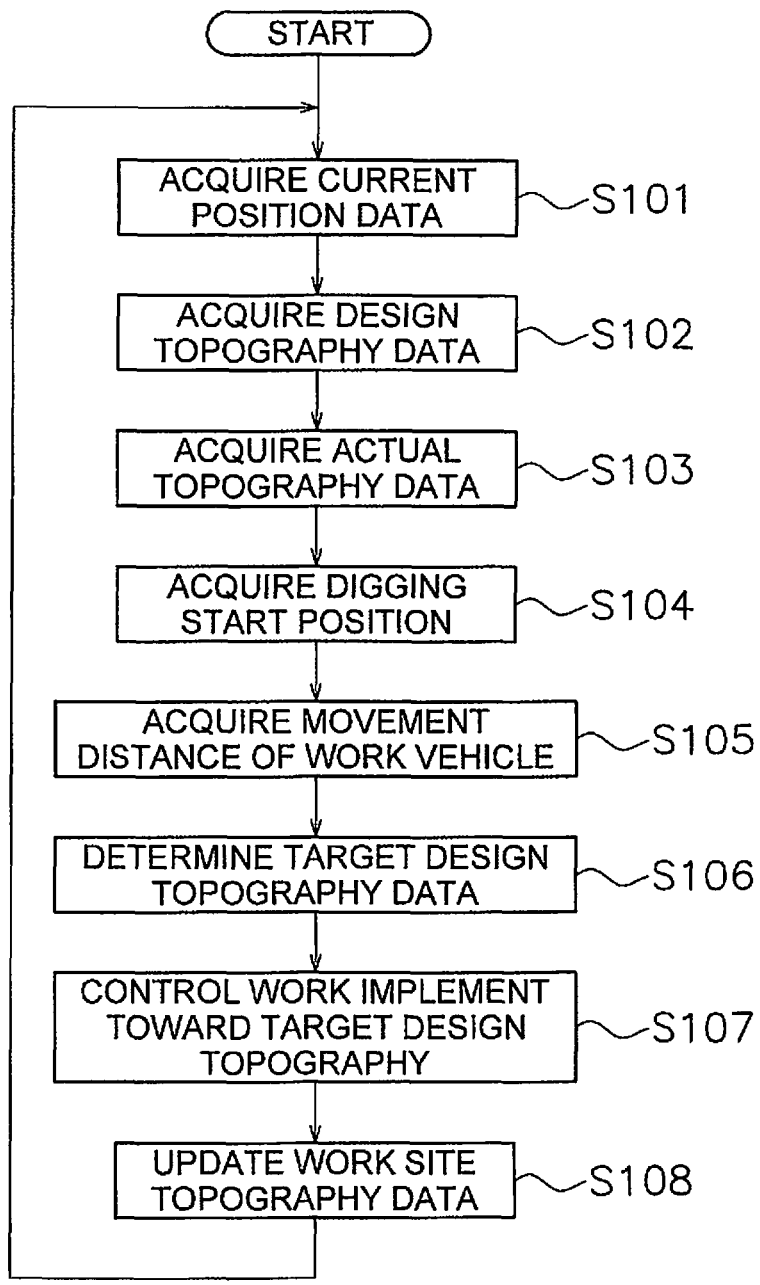
FIG. 4 is a flowchart showing a process of automatic control of a work implement.

Hereinafter, the automatic control of the work implement 13 in digging performed by the controller 26 will be described. FIG. 4 is a flowchart showing the process of the automatic control of the work implement 13 in the digging operation.

As illustrated in FIG. 4, in step S101, the controller 26 acquires current position data. The controller 26 acquires the current blade tip position P0.

Figure 5:
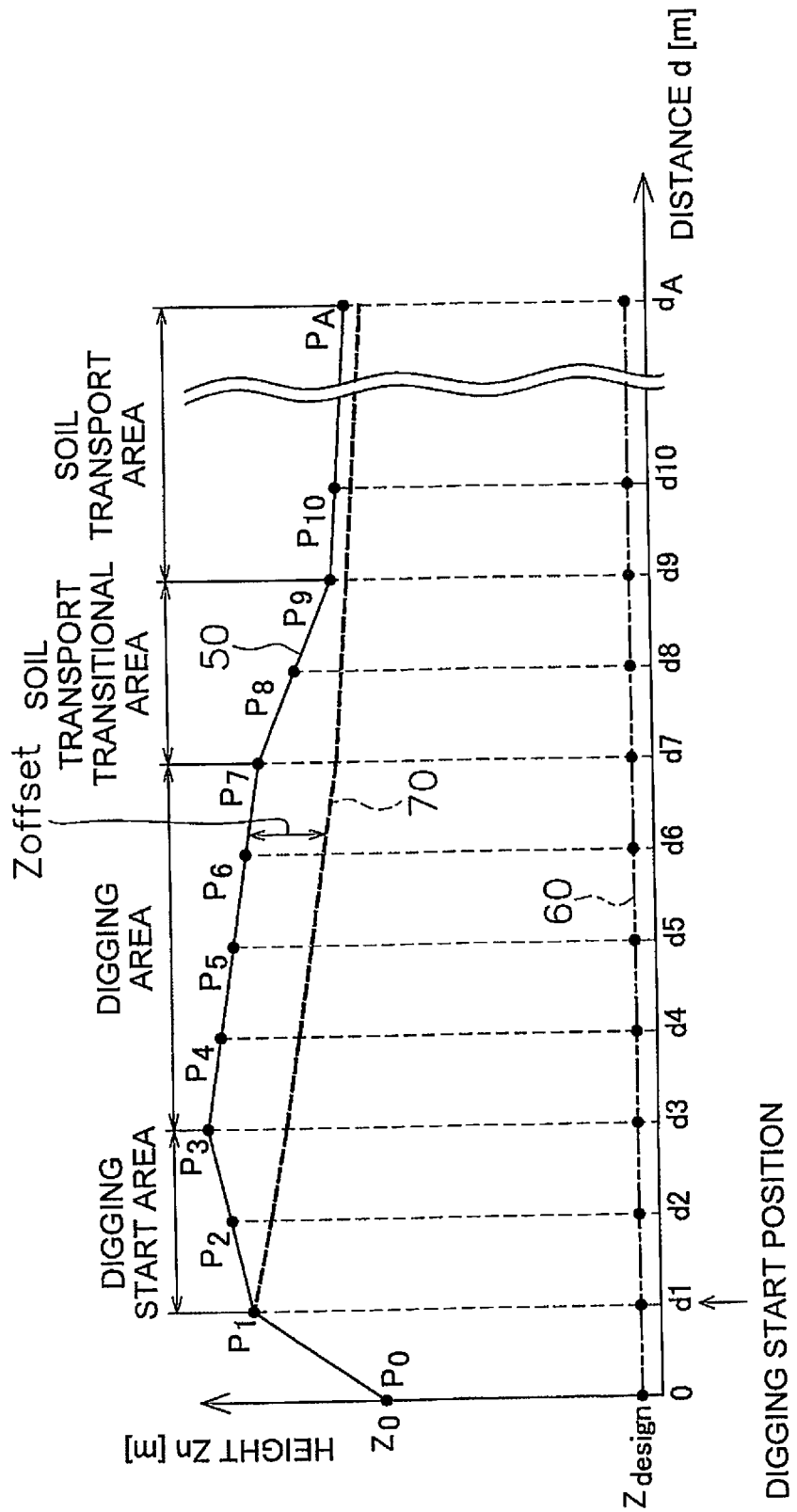
FIG. 5 is a diagram showing an example of a final design topography, an actual topography, and a target design topography.

In step S102, the controller 26 acquires the design topography data. As illustrated in FIG. 5, the design topography data includes the heights Zdesign of the final design topography 60 at a plurality of reference points Pn (n=0, 1, 2, 3, . . . , A) in the traveling direction of the work vehicle 1. The plurality of reference points Pn are on the traveling path of the blade 18. In FIG. 5, the final design topography 60 has a flat shape parallel to the horizontal direction, but may have a different shape.

In step S103, the controller 26 acquires the actual topography data. The controller 26 obtains the actual topography data by calculation from the work site topography data obtained from the storage device 28 and the position data and traveling direction data of the vehicle body obtained from the position sensor 31.

The actual topography data is information indicative of the terrain located in the traveling direction of the work vehicle 1. FIG. 5 shows a cross section of the actual topography 50. In FIG. 5, the vertical axis indicates the height of the topography, and the horizontal axis indicates the distance from the current position of the work vehicle 1 in the traveling direction.

In detail, the actual topography data includes the heights Zn of the actual topography 50 at a plurality of reference points Pn from the current position to a predetermined topography recognition distance dA in the traveling direction of the work vehicle 1. However, the current position may be determined based on the current position of the other part of the work vehicle 1. The plurality of reference points are arranged at predetermined intervals, for example, every 1 m.

In step S104, the controller 26 acquires the digging start position. For example, the controller 26 acquires, as the digging start position, a position when the blade tip position P0 first falls below the height Z0 of the actual topography 50. As a result, the position at which the blade tip of the blade 18 is lowered to start digging the actual topography 50 is obtained as the digging start position. However, the controller 26 may obtain the digging start position by another method. For example, the controller 26 may obtain the digging start position based on the operation of the second operating device 25b. Alternatively, the controller 26 may obtain the digging start position by calculating the optimum digging start position from the actual topography data.

In step S105, the controller 26 acquires the movement amount of the work vehicle 1. The controller 26 acquires, as the movement amount, the distance traveled from the digging start position to the current position in the advancing path of the blade 18. The movement amount of the work vehicle 1 may be the movement amount of the vehicle body 11. Alternatively, the movement amount of the work vehicle 1 may be the movement amount of the tip of the blade 18.

In step S106, the controller 26 determines target design topography data. The target design topography data shows the target design topography 70 depicted by dashed lines in FIG. 5. The target design topography 70 is a target profile of the terrain to be worked on, and shows the desired shape as a result of the digging operation.

As illustrated in FIG. 5, the controller 26 determines the target design topography 70 displaced downward from the actual topography 50 by a target displacement Z_offset. The target displacement Z_offset is a target displacement in the vertical direction at each reference point Pn. In the present embodiment, the target displacement Z_offset is a target depth at each reference point Pn, and indicates the target position of the blade 18 below the actual topography 50. The target position of the blade 18 means the target blade tip position of the blade 18. In other words, the target displacement Z_offset indicates the soil amount per unit movement amount excavated by the blade 18. Therefore, the target design topography data indicates the relationship between the plurality of reference points Pn and the plurality of target soil amounts. The target displacement Z_offset is an example of a target load parameter related to the load on the blade 18.

The controller 26 determines the target design topography 70 so as not to pass over the final design topography 60 downward. Therefore, the controller 26 determines the target design topography 70 located above the final design topography 60 and below the actual topography 50 during the digging operation.

Specifically, the controller 26 determines the height Z of the target design topography 70 according to the following equation (1).

$$Z = Zn - Z\_offset \quad (1)$$

Figure 6:
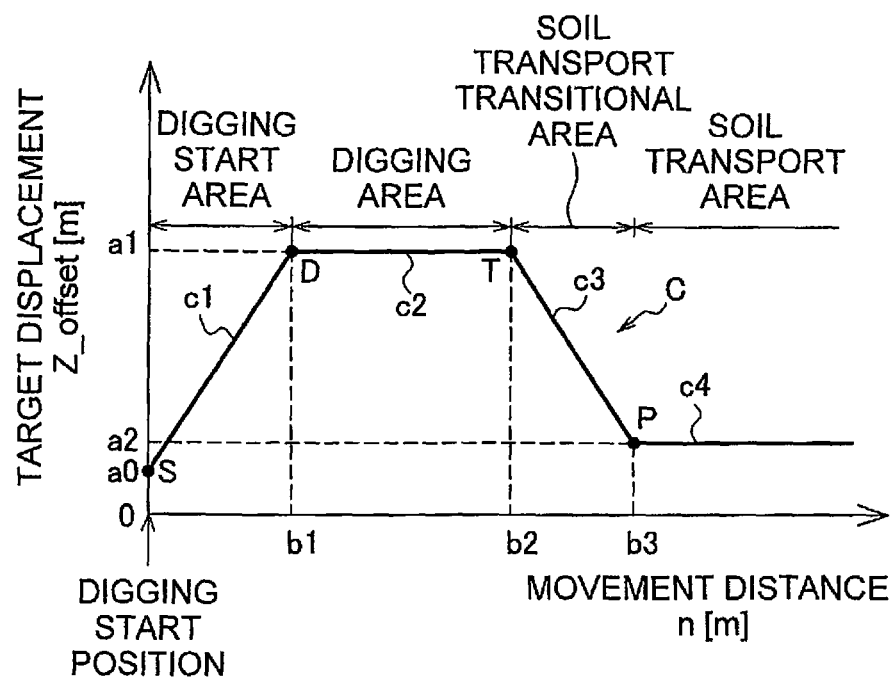
FIG. 6 is a diagram showing an example of target displacement data.

The target displacement Z_offset is determined by referring to the target displacement data C. The target displacement data C is stored in the storage device 28. FIG. 6 is a view showing an example of the target displacement data C. The target displacement data C defines the relationship between the movement amount n of the work vehicle 1 and the target displacement Z_offset.

Specifically, the target displacement data C indicates the digging depth (target displacement) Z_offset of the blade 18 in the vertical downward direction from the ground surface as a dependent variable of the horizontal movement amount n of the work vehicle 1. The horizontal movement amount n of the work vehicle 1 is substantially the same value as the horizontal movement amount of the blade 18. The controller 26 determines the target displacement Z_offset from the movement amount n of the work vehicle 1 with reference to the target displacement data C illustrated in FIG. 6.

As illustrated in FIG. 6, the target displacement data C includes start time data c1, digging time data c2, transitional time data c3, and soil transport time data c4. The start time data c1 defines the relationship between the movement amount n and the target displacement Z_offset in a digging start area. The digging start area is an area from the digging start point S to the steady digging start point D. As indicated by the start data c1, in the digging start area, the target displacement Z_offset that increases in accordance with the increase of the movement amount n is defined.

The digging time data c2 defines the relationship between the movement amount n and the target displacement Z_offset in a digging area. The digging area is an area from the steady digging start point D to the soil transfer start point T. As indicated by the digging time data c2, in the digging area, the target displacement Z_offset is defined to a constant value. The digging time data c2 defines a constant target displacement Z_offset with respect to the movement amount n. Although the target displacement Z_offset in the digging area is a constant value, it may not be a constant value. For example, the target displacement Z_offset may have a difference between the first half and the second half of the digging area.

The transitional time data c3 defines the relationship between the movement amount n and the target displacement Z_offset in a soil transport transitional area. The soil transport transitional area is an area from the steady digging end point T to the soil transportation start point P. The transitional time data c3 defines the target displacement Z_offset that decreases in accordance with the increase of the movement amount n.

The soil transport time data c4 defines the relationship between the movement amount n in the soil transport area and the target displacement Z_offset. The soil transport area is an area started from the soil transportation start point P. As indicated by the soil transport time data c4, in the soil transport area, the target displacement Z_offset is defined to a constant value. The soil transport time data c4 defines a constant target displacement Z_offset with respect to the movement amount n.

In detail, the digging area is started from the first start value b1 and ends at the first end value b2. The soil transport area is started from the second start value b3. The first end value b2 is smaller than the second start value b3. The target displacement Z_offset in the digging area is constant at the first target value a1. The target displacement Z_offset in the soil transport area is constant at the second target value a2. The first target value a1 is greater than the second target value a2. Therefore the target displacement Z_offset larger than that of the soil transport area is defined in the digging area.

The target displacement Z_offset at the digging start position is the start value a0. The start value a0 is smaller than the first target value a1. The start value a0 is smaller than the second target value a2.

Figure 7:
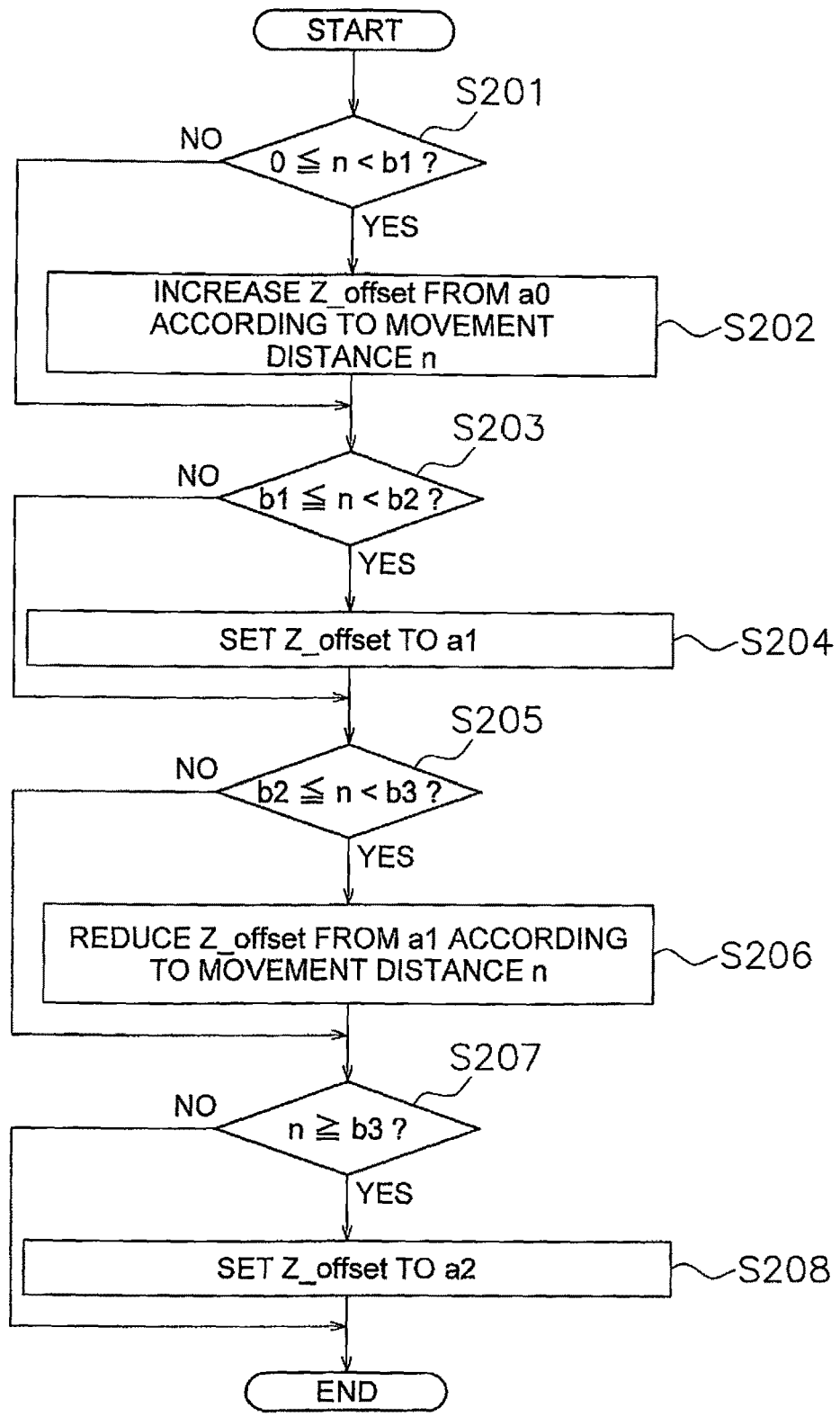
FIG. 7 is a flow chart showing a process for determining a target displacement.

FIG. 7 is a flowchart showing the process of determining the target displacement Z_offset. In order to simplify the explanation, in the determination process described below, it is assumed that the work vehicle 1 travels only forward. The determination process is started when the first operating device 25a moves to the forward position. In step S201, the controller 26 determines whether the movement distance n is 0 or more and less than the first start value b1. When the movement amount n is 0 or more and less than the first start value b1, in step S202, the controller 26 gradually increases the target displacement Z_offset from the start value a0 according to the increase of the movement amount n.

The start value a0 is a fixed value and is stored in the storage device 28. The start value a0 is preferably such a small value that the load on the blade 18 does not become excessively large at the start of digging. The first start value b1 is calculated from the inclination c1 in the digging start area illustrated in FIG. 6, the start value a0, and the first target value a1. The inclination c1 is a fixed value and is stored in the storage device 28. The inclination c1 is preferably a value that allows rapid transitional from the digging start to the digging operation and that the load on the blade 18 does not become excessively large.

In step S203, the controller 26 determines whether the movement amount n is equal to or greater than the first start value b1 and less than the first end value b2. When the movement amount n is equal to or greater than the first start value b1 and less than the first end value b2, the controller 26 sets the target displacement Z_offset to the first target value a1 in step S204. The first target value a1 is a fixed value and is stored in the storage device 28. The first target value a1 is preferably such a value that digging can be efficiently performed and the load on the blade 18 does not become excessively large.

In step S205, the controller 26 determines whether the movement amount n is equal to or greater than the first end value b2 and less than the second start value b3. When the movement amount n is equal to or more than the first end value b2 and less than the second start value b3, in step S206, the controller 26 gradually reduces the target displacement Z_offset from the first target value a1 according to the increase of the movement amount n.

The first end value b2 is the movement amount when the current amount of soil held by the blade 18 exceeds a predetermined threshold. Therefore, the controller 26 reduces the target displacement Z_offset from the first target value a1 when the current amount of soil held by the blade 18 exceeds the predetermined threshold. The predetermined threshold is determined based on, for example, the maximum capacity of the blade 18. For example, the load on the blade 18 may be measured and the current amount of soil held by the blade 18 may be determined from the load by calculating. Alternatively, an image of the blade 18 may be acquired by a camera, and by analyzing the image, the current amount of soil held by the blade 18 may be calculated.

At the start of work, a predetermined initial value is set as the first end value b2. After the start of the work, the movement distance when the amount of soil held by the blade 18 exceeds the predetermined threshold is stored as an update value, and the first end value b2 is updated based on the stored update value.

In step S207, the controller 26 determines whether the movement amount n is equal to or greater than the second start value b3. When the movement amount n is equal to or larger than the second start value b3, the controller 26 sets the target displacement Z_offset to the second target value a2 in step S208.

The second target value a2 is a fixed value and is stored in the storage device 28. The second target value a2 is preferably set to a value suitable for soil transport work. The second start value b3 is obtained by calculation from the inclination c2 in the soil transport transitional area illustrated in FIG. 6, the first target value a1, and the second target value a2. The inclination c2 is a fixed value and is stored in the storage device 28. The inclination c2 is preferably a value such that the operation can be quickly transferred from the digging operation to the soil transport operation and the load on the blade 18 does not become excessively large.

The start value a0, the first target value a1, and the second target value a2 may be changed according to the situation of the work vehicle 1 or the like. The first start value b1, the first end value b2, and the second start value b3 may be stored in the storage device 28 as fixed values.

As described above, the height Z of the target design topography 70 is determined by determining the target displacement Z_offset.

In step S107 illustrated in FIG. 4, the controller 26 controls the blade 18 toward the target design topography 70. Here, the controller 26 generates a command signal to the work implement 13 so that the tip position of the blade 18 moves toward the target design topography 70 generated in step S106. The generated command signal is input to the control valve 27. Thereby, the blade tip position P0 of the work implement 13 moves along the target design topography 70.

In the above-described digging area, the target displacement Z_offset between the actual topography 50 and the target design topography 70 is large compared to the other areas. Thereby, the digging work of the actual topography 50 is performed in the digging area. In the soil transport area, the target displacement Z_offset between the actual topography 50 and the target design topography 70 is smaller compared to other areas. Thereby, in the soil transport area, excavation of the ground is avoided, and the soil held by the blade 18 is transported.

In step S108, the controller 26 updates the work site topography data. The controller 26 updates the work site topography data with the position data indicative of the latest trajectory of the blade tip position P0. Alternatively, the controller 26 may calculate the position of the bottom surface of the crawler belt 16 from the vehicle body position data and the vehicle body dimension data, and update the work site topography data with the position data indicative of the trajectory of the bottom surface of the crawler belt 16. In this case, the work site topography data can be updated immediately.

Alternatively, the work site topography data may be generated from survey data measured by a survey instrument external to the work vehicle 1. Alternatively, the actual topography 50 may be photographed by a camera, and the work site topography data may be generated from image data obtained by the camera. For example, aerial surveying with a UAV (Unmanned Aerial Vehicle) may be used. In the case of the external surveying instrument or camera, the work site topography data may be updated at predetermined intervals or at any time.

The above process is performed when the work vehicle 1 is moving forward. For example, when the first operating device 25a is in the forward position, the above process is performed. However, when the work vehicle 1 moves backward a predetermined distance or more, the digging start position, the movement distance n, and the amount of soil held by the blade 18 are initialized. However, when the work vehicle 1 moves backward a predetermined distance or more, the digging start position, the movement amount n, and the amount of soil held by the blade 18 are initialized.

The controller 26 updates the actual topography 50 based on the updated work site topography data, and newly determines the target design topography 70 based on the updated actual topography 50. The controller 26 then controls the blade 18 along the newly determined target design topography 70. By repeating such processing, digging is performed such that the actual topography 50 approaches the final design topography 60.

In the above embodiment, the controller 26 repeats the processing of steps S101 to S108 for each predetermined distance or each predetermined time during forward movement. However, the controller 26 may repeat the processing of steps S101 to S108 every predetermined distance or every predetermined time during reverse movement. In this case, when the work vehicle 1 moves forward by a predetermined distance or more, the digging start position and the movement amount n may be initialized. The controller 26 may repeat the processing of steps S101 to S108 every time the work vehicle 1 moves by a predetermined distance or every predetermined time.

Figure 8:
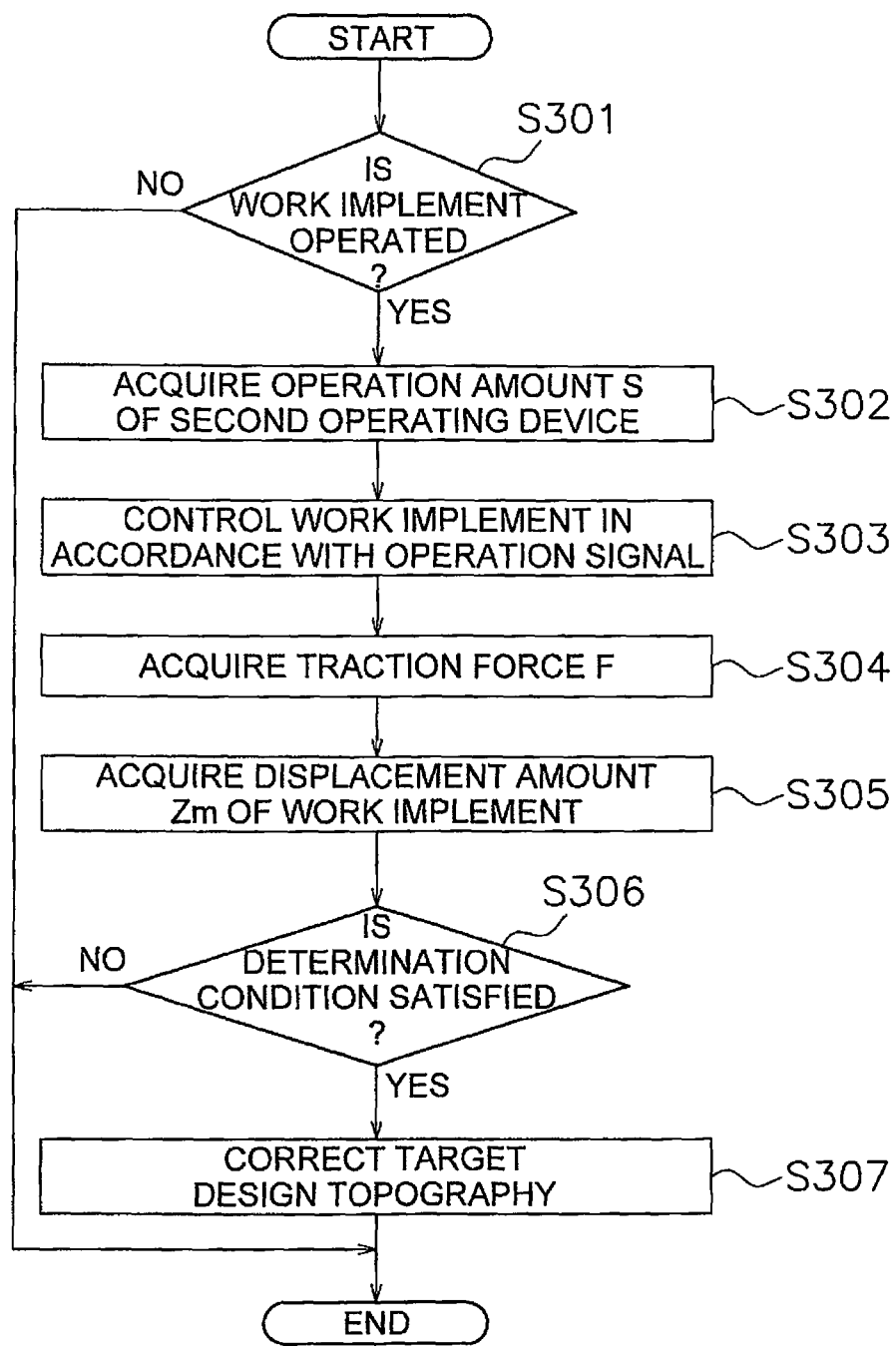
FIG. 8 is a flow chart showing a process for correcting a target design topography.

Next, processing when an operator's operation intervenes during the above-described automatic control of the work implement 13 will be described. When the second operating device 25b is operated by the operator during the automatic control, the controller operates the work implement 13 according to the operation signal from the second operating device 25b and corrects the target design topography according to the operation by the operator. FIG. 8 is a flowchart showing a process for correcting the target design topography in accordance with the operation by the operator.

As illustrated in FIG. 8, in step S301, the controller 26 determines whether there is an operation of the work implement 13. More specifically, the controller 26 determines from the operation signal from the second operating device 25b whether the second operating device 25b has performed an operation to raise the blade 18 (hereinafter referred to as "raising operation"). When the raising operation of the blade 18 is performed on the second operating device 25b, the controller 26 determines that the operation of the work implement 13 is present, and the process proceeds to step S302.

In step S302, the controller 26 acquires the operation amount S of the second operating device 25b. The controller 26 acquires the raising operation amount S of the second operating device 25b from the operation signal from the second operating device 25b. Specifically, the raising operation amount S is a stroke amount of the second operating device 25b from the neutral position to the raising position.

In step S303, the controller 26 controls the work implement 13 in accordance with the operation signal. The controller 26 outputs a command signal to the control valve 27 so as to raise the blade 18 in accordance with the raising operation amount S of the second operating device 25b. Thus, the operation by the operator intervenes to the automatic control of the work implement 13, and the work implement 13 moves in response to manual operation by the operator. The processing of step S302 by the controller 26 may be omitted and the control valve 27 may be controlled by applying the pilot hydraulic pressure from the second operating device 25b to the control valve 27.

In step S304, the controller 26 acquires the traction force F. The controller 26 obtains the traction force F by calculating the traction force F from the detection value of the output sensor 34. When the power transmission 24 of the work vehicle 1 is HST, the controller 26 can calculate the traction force from the hydraulic pressure of the hydraulic motor and the rotational speed of the hydraulic motor. The traction force is the load that work vehicle 1 receives.

When the power transmission 24 has a torque converter and a transmission, the controller 26 can calculate the traction force from the output rotational speed of the torque converter. Specifically, the controller 26 calculates the traction force from the following equation (2).

$$F = k \times T \times R / (L \times Z) \qquad (2)$$

Here, F is a traction force, k is a constant, T is a transmission input torque, R is a reduction ratio, L is a crawler link pitch, and Z is a sprocket tooth number. The input torque T is calculated based on the output rotational speed of the torque converter. However, the method of detecting the traction force is not limited to that described above, and may be detected by another method.

In step S305, the controller 26 acquires the displacement amount Zm of the work implement 13. The controller 26 acquires the vertical displacement amount Zm between the blade tip position of the blade 18 at the start of the raising operation by the operator and the blade tip position at the end of the raising operation from the blade tip position data described above.

In step S306, the controller 26 determines whether a predetermined determination condition is satisfied. The determination conditions include the following first to fourth conditions as AND conditions. The first condition is that the traction force F is equal to or less than a predetermined threshold f1. The threshold f1 may be a numerical value indicative of that it is a soil transportation operation.

The second condition is that the raising operation of the blade 18 is continued for a predetermined time t1 or more. The predetermined time t1 may be, for example, an appropriate value to exclude the case where the raising operation is performed for a very short time. The second condition may be that the state in which the amount of raising operation S is the predetermined amount s1 or more continues for the predetermined time t1 or more in order to ignore the minute raising operation.

The third condition is that the movement amount n from the above-described digging start position is larger than the predetermined distance n1. The predetermined distance n1 may be an appropriate value for prohibiting the correction of the target design topography 70 in the area prior to the soil transport area. Alternatively, the predetermined distance n1 may be an appropriate value for prohibiting the correction of the target design topography 70 in the area prior to the soil transport transitional area or the digging area.

The fourth condition is that the displacement amount Zm of the work implement 13 is within a predetermined range. That is, the fourth condition is that the displacement amount Zm of the work implement 13 is larger than the lower limit value zm1 of the displacement amount and smaller than the upper limit value zm2 of the displacement amount (zm1<Zm<zm2). The lower limit value zm1 of the displacement amount may be a numerical value for ignoring a minute raising operation. The upper limit value zm2 of the displacement amount may be a numerical value for excluding the raising operation for avoiding the obstacle.

When all of the first to fourth conditions are satisfied, the controller 26 determines that the determination condition is satisfied, and the process proceeds to step S307. In step S307, the controller 26 corrects the target design topography 70. The controller 26 corrects the target design topography 70 by displacing the target design topography 70 in the vertical direction by the displacement amount Zm. The controller 26 corrects the target design topography 70 by correcting the height Z of the target design topography 70 with the displacement amount Zm according to the following equation (3).

$$Z = Zn - Z\_\text{offset} + Zm \qquad (3)$$

Figure 9:
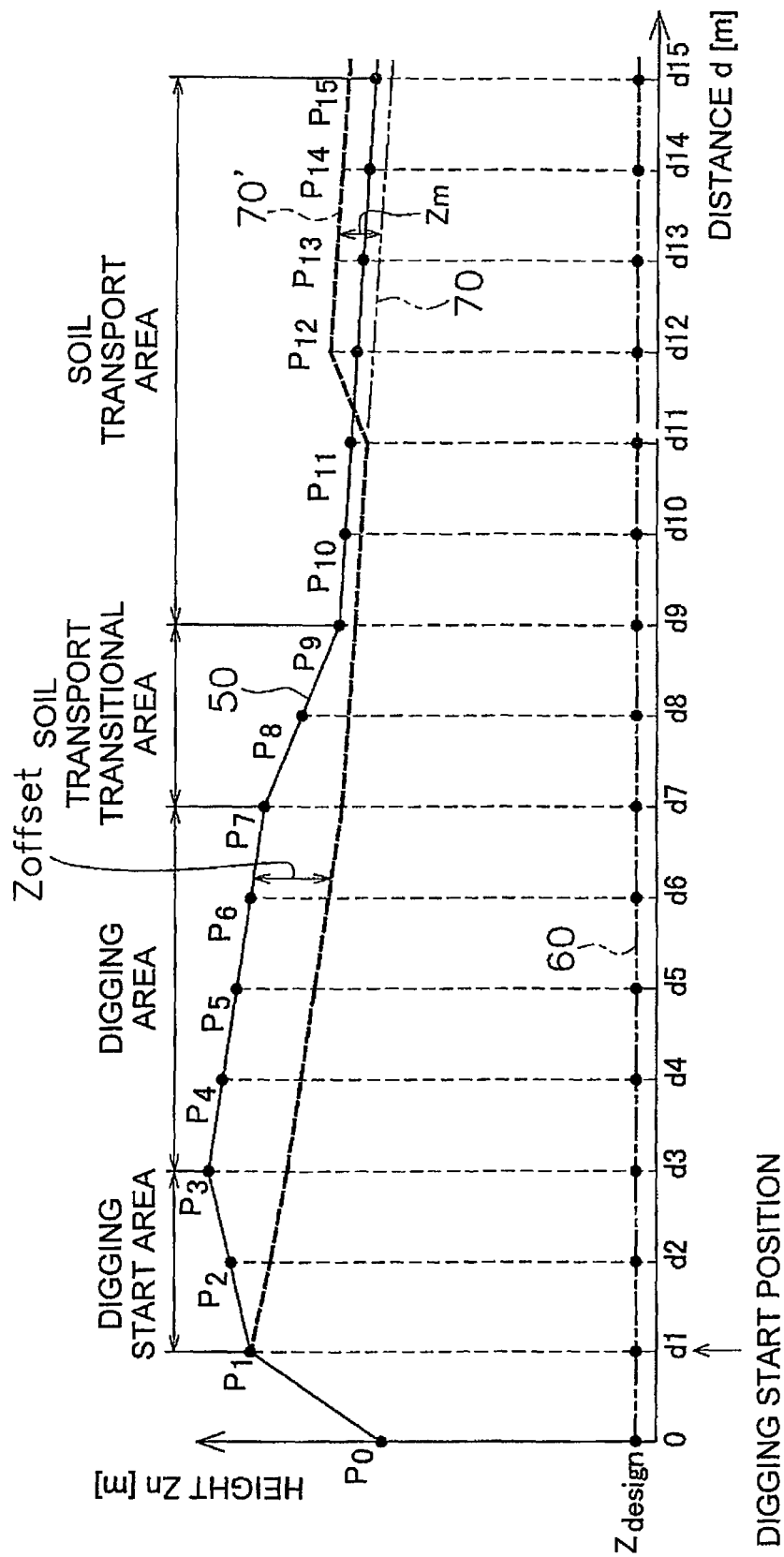
FIG. 9 is a diagram showing an example of a corrected target design topography.

For example, as illustrated in FIG. 9, it is assumed that the operator performs the raising operation of the blade 18 at the reference point P12. The controller 26 acquires the vertical displacement amount Zm between the blade tip position at the start of the raising operation by the operator and the blade tip position at the end of the raising operation. If the above-described determination condition is satisfied, the controller 26 determines the corrected target design topography 70' by displacing the initial target design topography 70 in the vertical direction by the displacement amount Zm. The controller 26 then controls the blade 18 with respect to the corrected target design topography 70'. Thereby, the blade tip position of the work implement 13 moves along the corrected target design topography 70'.

When the traveling direction of the work vehicle 1 is switched to the reverse from the forward and the work vehicle 1 moves backward a predetermined distance or more, similar to the digging start position, the movement amount n and the like, the correction amount of the target design topography 70 according to the raising operation of the blade 18 by the operator is also initialized. That is, the above Zm is reset to "0".

In addition, when the operation of the second operating device 25b by the operator is an operation to lower the blade 18 (hereinafter, referred to as "lowering operation"), the correction amount of the target design topography 70 is invalidated. That is, when the operation of the second operating device 25b by the operator is the lowering operation of the blade 18, the above Zm is set to "0".

Figure 10:
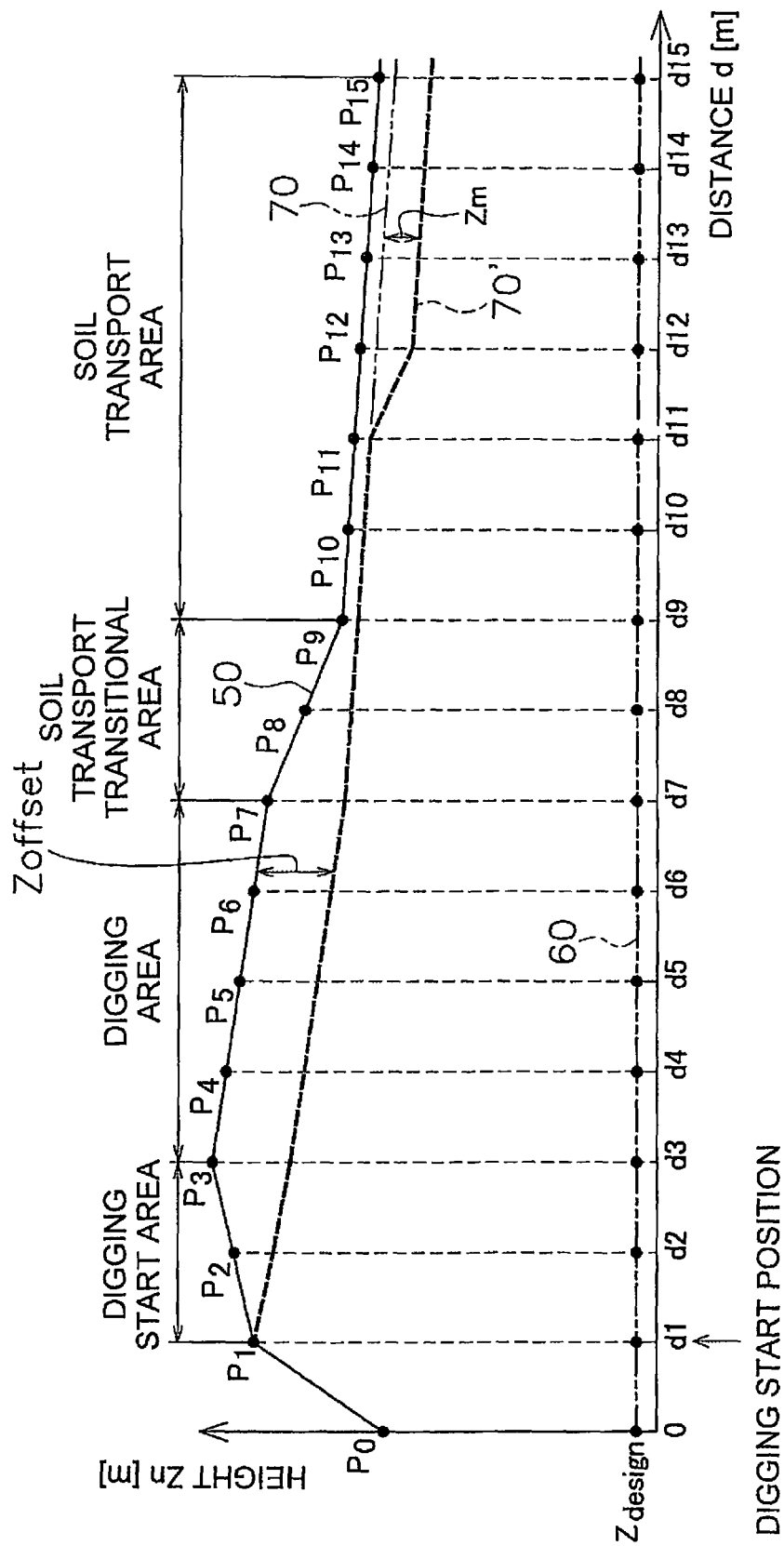
FIG. 10 is a diagram showing another example of the corrected target design topography.

However, even when the operation of the second operating device 25b by the operator is the lowering operation of the blade 18, the correction of the target design topography 70 described above may be performed. For example, as illustrated in FIG. 10, the controller 26 may acquire the vertical displacement amount Zm between the blade tip position at the start of the lowering operation of the blade 18 by the operator and the blade tip position at the end of the lowering operation and may determine the corrected target design topography 70' by displacing the design topography 70 downward by a displacement amount Zm.

According to the control system 3 of the work vehicle 1 according to the present embodiment, when an operation of the work implement 13 by an operator is performed during the automatic control, the target design topography 70 is corrected in accordance with the operation by the operator. Therefore, the position of the work implement 13 can be easily changed by the intention of the operator without the operator performing a complicated operation to cancel the automatic control.

For example, when the work implement 13 is working in the soil transport area by automatic control, the operator operates the second operating device 25b to raise blade 18 to change the work by the work implement 13 to spreading operation. The spreading operation means to spread the soil in layers on the actual topography.

Preferred embodiments of the present invention have been explained above. However, the present invention is not limited to the aforementioned preferred embodiments, and a variety of changes can be made without departing from the scope of the present invention.

The work vehicle 1 is not limited to a bulldozer, but may be another vehicle such as a wheel loader or a motor grader.

The work vehicle 1 may be a remotely steerable vehicle. In that case, part of the control system 3 may be arranged outside the work vehicle 1. For example, the controller 26 may be disposed outside the work vehicle 1. The controller 26 may be located in a control center remote from the work site.

Figure 11:
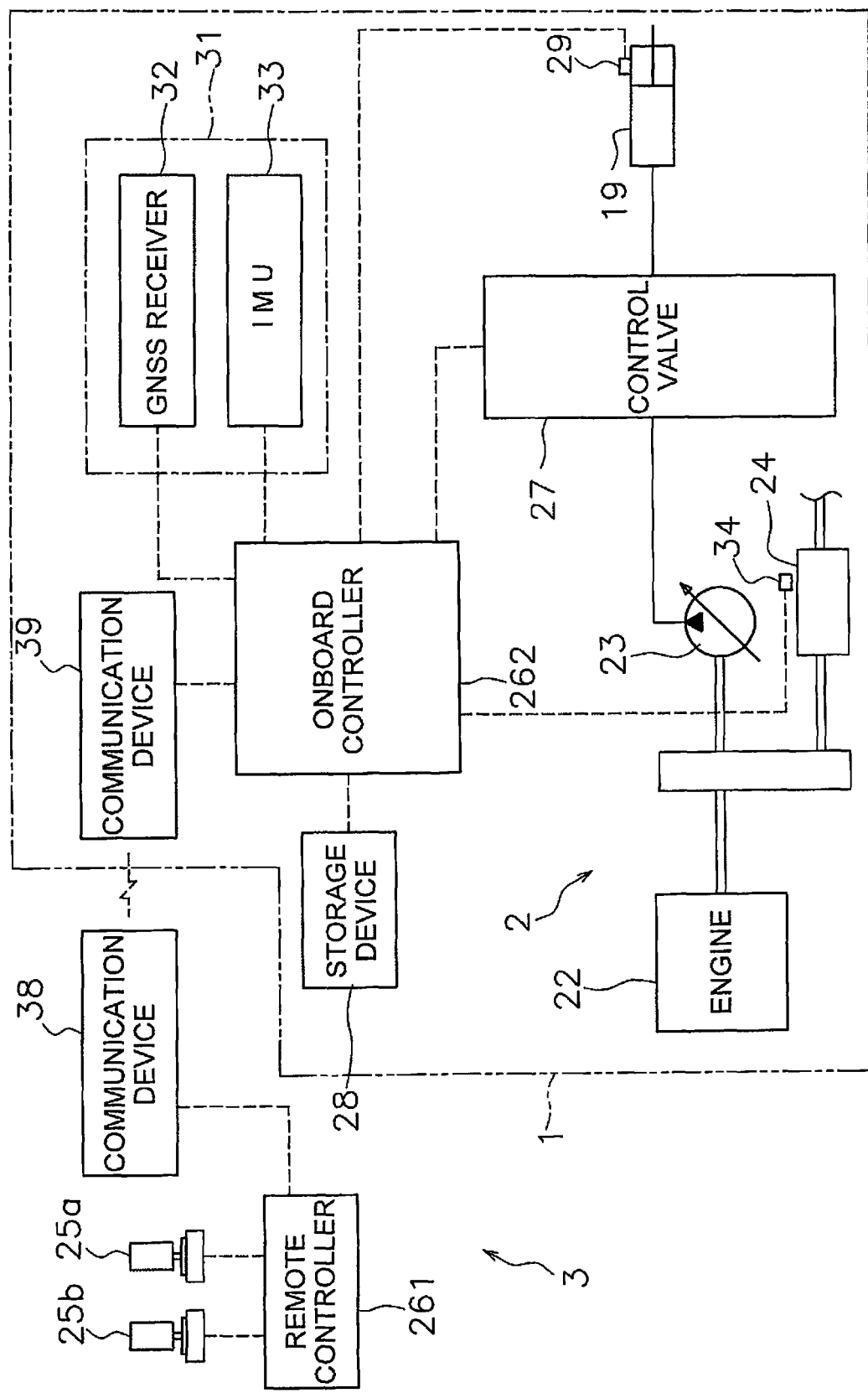
FIG. 11 is a block diagram showing a configuration of a control system according to a first modification.

The controller 26 may have a plurality of controllers 26 separate from one another. For example, as illustrated in FIG. 11, the controller 26 may include a remote controller 261 which is arranged outside the work vehicle 1 and an onboard controller 262 mounted to the work vehicle 1. The remote controller 261 and the onboard controller 262 may be able to communicate wirelessly via the communication devices 38 and 39. Then, part of the functions of the controller 26 described above may be performed by the remote controller 261, and the remaining functions may be performed by the onboard controller 262. For example, the process of determining the target design topography 70 may be performed by the remote controller 261, and the process of outputting a command signal to the work implement 13 may be performed by the onboard controller 262.

The operating devices 25a and 25b may be disposed outside the work vehicle 1. In that case, the cab may be omitted from the work vehicle 1. Alternatively, the operating devices 25a, and 25b may be omitted from the work vehicle 1. The work vehicle 1 may be operated only by the automatic control by the controller 26 without the operation by the operating devices 25a and 25b.

Figure 12:
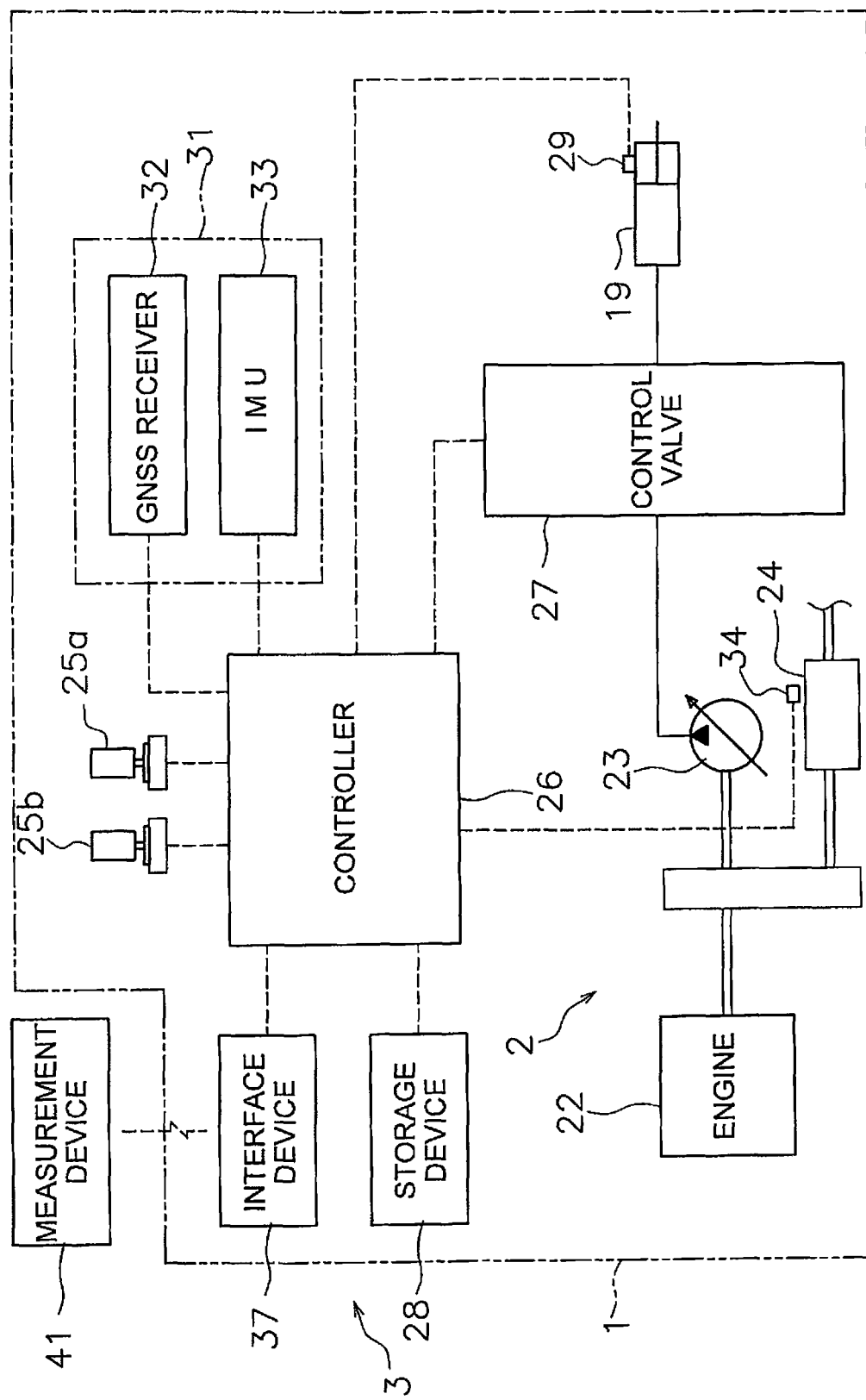
FIG. 12 is a block diagram showing a configuration of a control system according to a second modified example.

The actual topography 50 may be acquired by other devices as well as the position sensor 31 described above. For example, as illustrated in FIG. 12, the actual topography 50 may be acquired by the interface device 37 that receives data from an external device. The interface device 37 may receive the actual topography data measured by the external measurement device 41 by radio. Alternatively, the interface device 37 may be a reading device of a recording medium, and may receive the actual topography data measured by the external measurement device 41 via the recording medium.

In the above embodiment, in the soil transport area, the target design topography is corrected when the operator's raising operation (or lowering operation) is performed. However, the target design topography may be corrected according to the displacement amount Zm of the blade tip position when an operator's raising operation (or lowering operation) is intervened in other regions.

Figure 13:
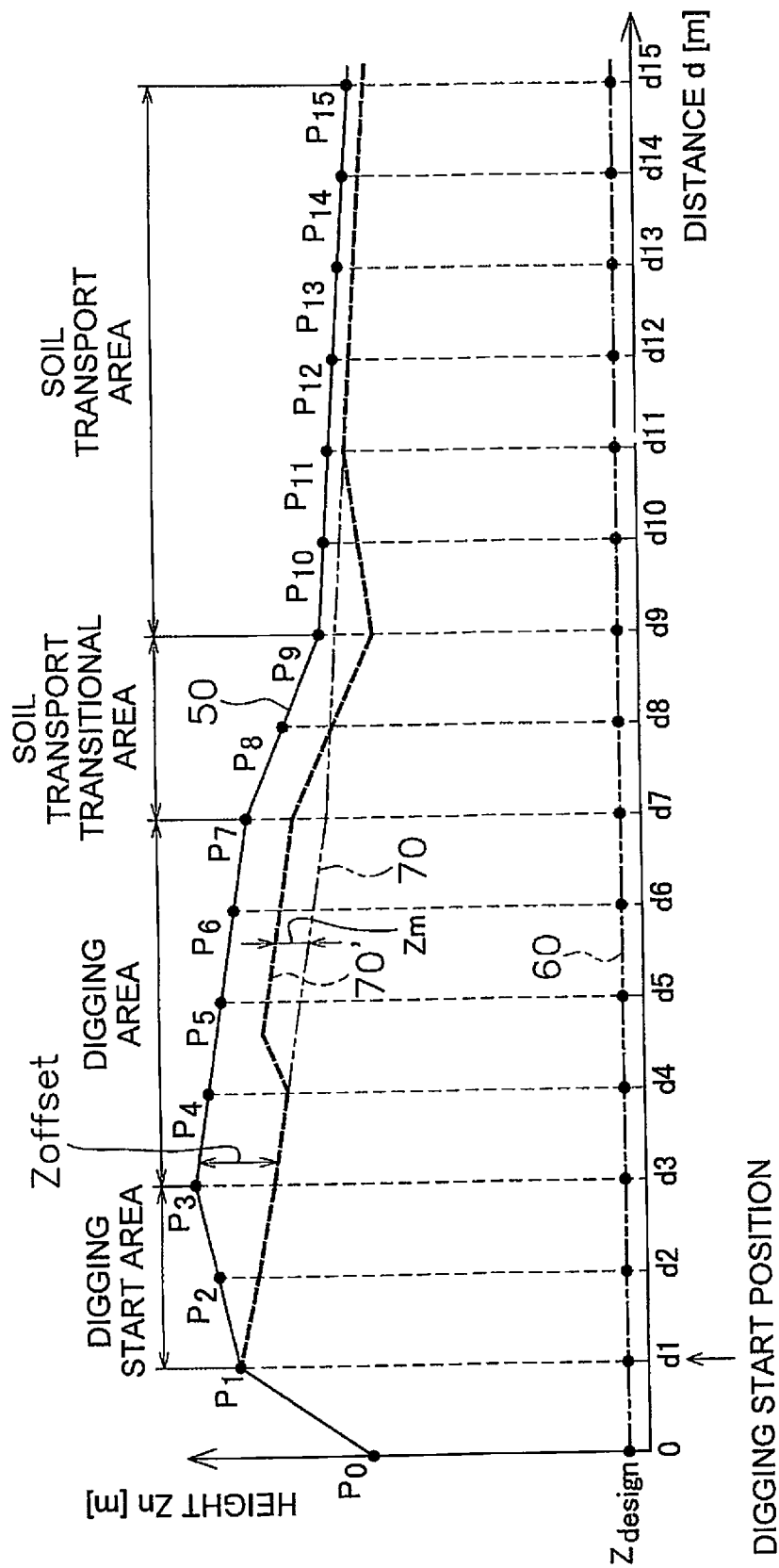
FIG. 13 is a diagram showing an example of a corrected target design topography according to another embodiment.
Figure 14:
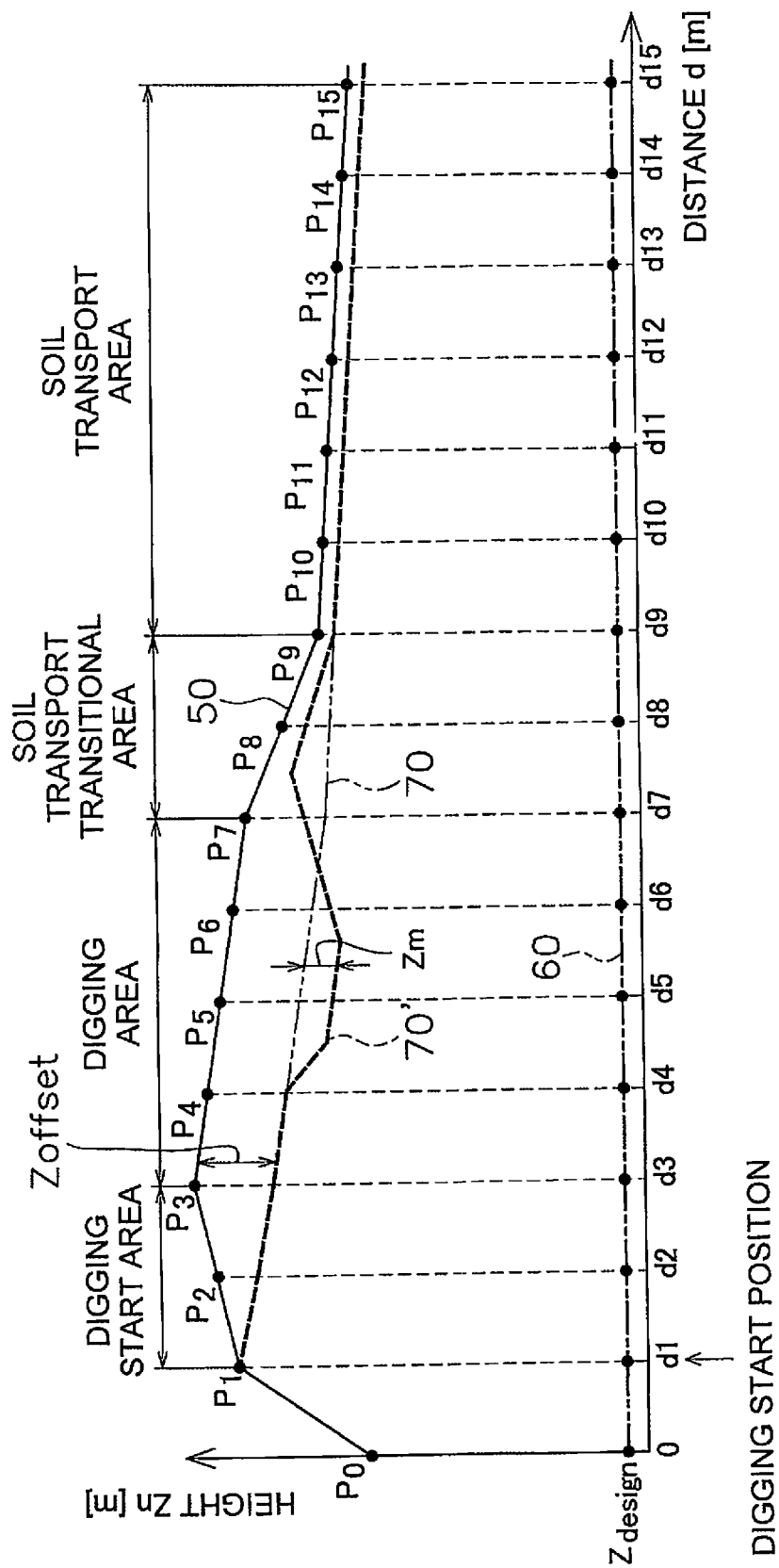
FIG. 14 shows an example of a corrected target design topography according to another embodiment.

For example, FIG. 13 shows the corrected target design topography 70' when the operator's raising operation is intervened in the digging area. In this case, the controller 26 determines the corrected target design topography 70' by displacing the initial target design topography 70 upward by a displacement amount Zm. Alternatively, FIG. 14 shows the corrected target design topography 70' when the operator's lowering operation is intervened in the digging area. In this case, the controller 26 determines the corrected target design topography 70' by displacing the initial target design topography 70 downward by the amount of displacement amount Zm.

The target displacement data is not limited to the data illustrated in FIG. 6 and may be changed. The target displacement data may be data indicative of the relationship between the target load parameter and the movement amount. Alternatively, the controller 26 may determine the target design topography 70 with reference to target load parameter data indicative of the relationship between the target load parameter and the current position of the work vehicle 1. The target load parameter may be a parameter related to the load on the work implement 13 and is not limited to the target displacement as in the above embodiment.

Figure 15:
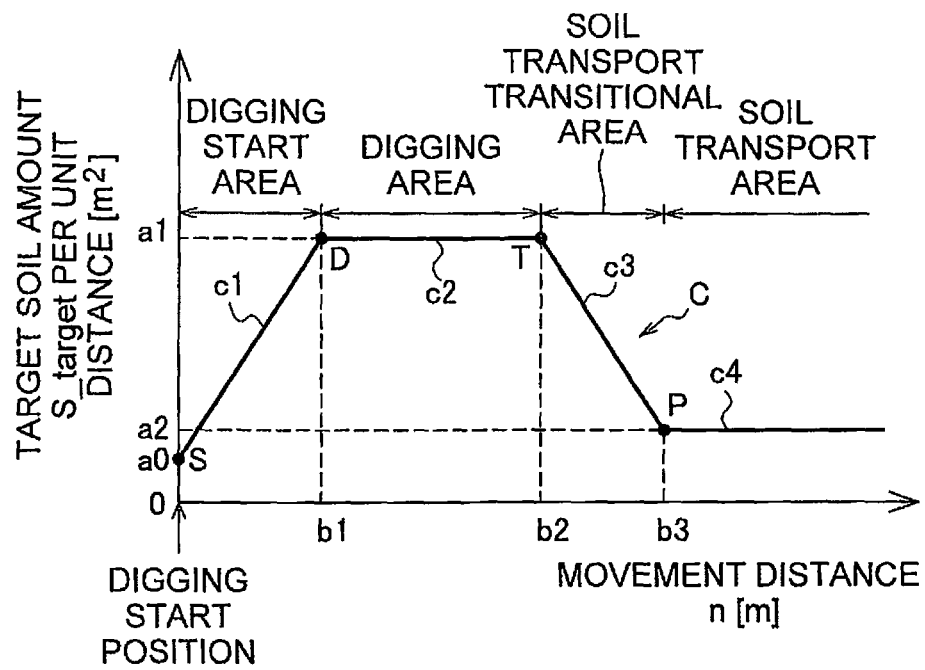
FIG. 15 is a diagram showing an example of target load parameter data.

For example, FIG. 15 is a diagram showing another example of the target load parameter data. As illustrated in FIG. 15, the target load parameter may be a target soil amount S_target for each point of flat terrain. That is, the target load parameter may be the target soil amount S_target per unit distance. For example, the controller 26 can calculate the target displacement Z_offset from the target soil amount S_target and the width of the blade 18.

Alternatively, the target load parameter may be a parameter different from the target soil amount S_target per unit distance. For example, the target load parameter may be a parameter indicative of the target value of the load on the work implement 13 at each point. The controller 26 can calculate the target displacement Z_offset for each point from the target load parameter. In that case, the controller 26 may increase the target displacement Z_offset in response to the increase of the target load parameter.

Figure 16:
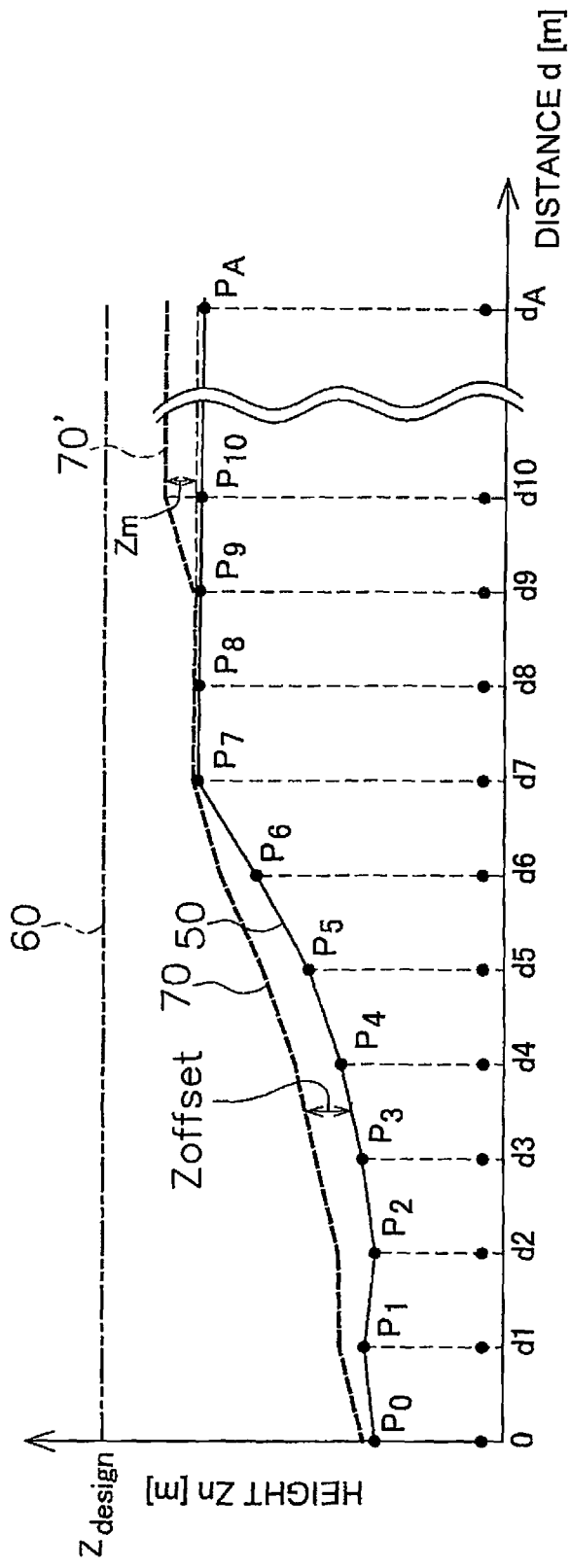
FIG. 16 is a diagram showing another example of the target design topography.

As illustrated in FIG. 16, the controller 26 may determine the target design topography 70 displaced upward by the target displacement Z_offset from the actual topography 50. In this case, a filling operation can be performed instead of the digging operation. Further, as illustrated in FIG. 16, the controller 26 may determine the corrected target design topography 70' from the target design topography 70 in accordance with the operation of the work implement 13 by the operator.

The target displacement Z_offset may be multiplied by a predetermined coefficient. Alternatively, a predetermined constant may be added to or subtracted from the target displacement Z_offset. The predetermined coefficient and the predetermined constant may be changed according to the change of the control mode.

The determination conditions are not limited to the above-described first to fourth conditions, and may be changed. For example, some of the first to fourth conditions may be omitted or changed. The determination conditions may include conditions different from the first to fourth conditions.

The displacement amount Zm is not limited to the amount of displacement in the vertical direction between the blade tip position at the start of the operation by the operator and the blade tip position at the end of the operation, and may be another value. For example, the controller 26 may acquire, as the displacement amount Zm, a vertical displacement amount between the blade tip position at the end of the operation by the operator and the target design topography 70. Alternatively, the controller 26 may determine the displacement amount Zm in accordance with the operation amount of the second operating device 25b by the operator.

The controller 26 may acquire the actual topography data within a range shorter than the predetermined topography recognition distance dA from the current position. That is, the controller 26 may acquire the actual topography data for only a part of the plurality of reference points Pn. The controller 26 may determine the target design topography 70 within a range shorter than the predetermined topography recognition distance dA from the current position. That is, the controller 26 may determine the target design topography 70 for only a part of the plurality of reference points Pn.

According to the present invention, a position of a work implement during automatic control of the work implement can be easily changed according to an operator's intention.

The invention claimed is:

1. A control system for a work vehicle including a work implement, the control system comprising:
   an operating device configured to output an operation signal indicative of an operation by an operator;
   a sensor configured to output a work implement position signal indicative of a position of the work implement, and
   a controller in communication with the operating device, the controller being configured to
   determine a target profile of a terrain to be worked on,
   generate a command signal to operate the work implement according to the target profile,
   receive the operation signal from the operating device and the work implement position signal from the sensor,
   determine an operation of the work implement based on the operation signal,
   acquire a displacement amount of the work implement in a vertical direction according to the operation by the operator, and
   correct the target profile by displacing the target profile in the vertical direction by the displacement amount when the operation of the work implement is performed.

2. The control system for a work vehicle according to claim 1, wherein
   the controller is further configured to
   acquire actual topography data indicative of an actual topography of the terrain to be worked on,
   determine a target design topography obtained by displacing the actual topography in the vertical direction, and
   set the target design topography as the target profile.

3. The control system for a work vehicle according to claim 1, wherein
   the controller is further configured to correct the target profile according to the operation by the operator when a predetermined determination condition is satisfied, and
   the determination condition includes that raising or lowering operation of the work implement continues for at least a predetermined time.

4. A work vehicle comprising:
   a work implement;
   an operating device configured to output an operation signal indicative of an operation by an operator;
   a sensor configured to output current position data indicative of a position of the work vehicle; and
   a controller configured to control the work implement, the controller being configured to
   determine a target profile of a terrain to be worked on,
   generate a command signal to operate the work implement according to the target profile,
   receive the operation signal from the operating device and acquire the current position data from the sensor,
   determine an operation of the work implement based on the operation signal,
   acquire a movement amount of the work vehicle based on the current position data, and
   correct the target profile according to the operation by the operator when the operation of the work implement is performed and a predetermined determination condition is satisfied,
   the determination condition including that the movement amount of the work vehicle is at least equal to a predetermined distance.

5. A method implemented by a controller to control a work vehicle including a work implement, the method comprising:
   determining a target profile of a terrain to be worked on;
   generating a command signal to operate the work implement according to the target profile;
   receiving an operation signal indicative of an operation by an operator;
   determining an operation of the work implement based on the operation signal;
   acquiring current position data indicative of a position of the work vehicle;
   acquiring a movement amount of the work vehicle based on the current position data; and
   correcting the target profile according to the operation by the operator when the operation of the work implement is performed and a predetermined determination condition is satisfied,
   the determination condition including that the movement amount of the work vehicle is at least equal to a predetermined distance.

6. A control system for a work vehicle including a work implement, the control system comprising:
   an operating device configured to output an operation signal indicative of an operation by an operator; and
   a controller in communication with the operating device, the controller being configured to
   determine a target profile of a terrain to be worked on,
   generate a command signal to operate the work implement according to the target profile,
   receive the operation signal from the operating device,
   determine an operation of the work implement based on the operation signal,
   acquire current position data indicative of a current position of the work vehicle, acquire a movement amount of the work vehicle based on the current position data, and correct the target profile according to the operation by the operator when the operation of the work implement is performed and a predetermined determination condition is satisfied, the determination condition including that the movement amount of the work vehicle is at least equal to a predetermined distance.

7. A method implemented by a controller to control a work vehicle including a work implement, the method comprising:

determining a target profile of a terrain to be worked on;

generating a command signal to operate the work implement according to the target profile;

receiving an operation signal indicative of an operation by an operator and a work implement position signal indicative of a position of the work implement;

determining an operation of the work implement based on the operation signal;

acquiring a displacement amount of the work implement in a vertical direction according to the operation by the operator; and correcting the target profile by displacing the target profile in the vertical direction by the displacement amount when the operation of the work implement is performed.

8. The method according to claim 7, further comprising:

acquiring actual topography data indicative of an actual topography of the terrain to be worked on; and determining a target design topography obtained by displacing the actual topography in the vertical direction, the target design topography being set as the target profile.

9. The method according to claim 7, wherein the target profile is corrected when a predetermined determination condition is satisfied, and the determination condition includes that raising or lowering operation of the work implement continues for at least a predetermined time.

10. A work vehicle comprising:

a work implement;

an operating device configured to output an operation signal indicative of an operation by an operator;

a sensor configured to output a work implement position signal indicative of a position of the work implement, and a controller configured to control the work implement, the controller being further configured to determine a target profile of a terrain to be worked on, generate a command signal to operate the work implement according to the target profile, receive the operation signal from the operating device and the work implement position signal from the sensor, determine an operation of the work implement based on the operation signal, acquire a displacement amount of the work implement in a vertical direction according to the operation by the operator, and correct the target profile by displacing the target profile in the vertical direction by the displacement amount when the operation of the work implement is performed.

11. The work vehicle according to claim 10, wherein the controller is further configured to correct the target profile according to the operation by the operator when a predetermined determination condition is satisfied, and the determination condition includes that raising or lowering operation of the work implement continues for at least a predetermined time.

\* \* \* \* \*